(12) United States Patent
Huang

(10) Patent No.: US 6,891,721 B2
(45) Date of Patent: May 10, 2005

(54) PORTABLE HARD DISK DRIVE

(76) Inventor: Cheng Yu Huang, 4F, 4, Lane 6, Alley 48, Cheng Chang St., Hsinchung, Taipei (TW)

( * ) Notice: Subject to any disclaimer, the term of this patent is extended or adjusted under 35 U.S.C. 154(b) by 153 days.

(21) Appl. No.: 10/422,694

(22) Filed: Apr. 25, 2003

(65) Prior Publication Data
US 2004/0190192 A1 Sep. 30, 2004

(30) Foreign Application Priority Data

Mar. 31, 2003 (CN) .................................. 92204997 U

(51) Int. Cl.$^7$ ................................................. G06F 1/16
(52) U.S. Cl. ....................................................... 361/685
(58) Field of Search ............................. 312/332.1, 333; 361/685, 724–727, 726

(56) References Cited

U.S. PATENT DOCUMENTS 5,130,891 A * 7/1992 Christie ...................... 361/726
5,557,499 A * 9/1996 Reiter et al. ................. 361/685
6,061,244 A * 5/2000 O'Sullivan et al. .......... 361/727
6,351,374 B1 * 2/2002 Sherry ......................... 361/685

* cited by examiner

*Primary Examiner*—Lynn Feild
*Assistant Examiner*—Zachary Pape
(74) *Attorney, Agent, or Firm*—Troxell Law Office, PLLC

(57) ABSTRACT

A portable disk drive in accordance with the present invention includes a housing made from aluminum alloy. The housing is provided with a front cover having a hook release button mounted thereon. The housing is provided with transparent side panels, which is illuminated when standby. A rear panel integrally formed with a supporting bracket on which a printed circuit board is mounted. The printed circuit board is mounted LED with respect to the transparent side panels. The supporting bracket is provided with a latch, which interlocks with a hook of the hook release button when the support bracket is inserted into the housing. When the portable hard disk drive is electrically connected, the LED illuminates the side panels.

4 Claims, 3 Drawing Sheets

PORTABLE HARD DISK DRIVE

FIELD OF THE INVENTION

The present invention relates to a portable hard disk drive, and more particular to a portable hard disk drive in which a hard disk drive can be easily and smoothly installed and uninstalled. The portable hard disk drive is provided with illuminating device when standby. A front panel is provided with a hook release button and a supporting bracket is provided with a latch so as to provide a quick hook and release function. A printed circuit board mounted therein is provided with a printed circuit board on which LED devices are provided so as to provide colorful lights indicating power on.

DESCRIPTION OF PRIOR ART

A portable hard disk drive has been developed and introduced based on the requirement and need from a personal computer. A portable hard disk drive provides convenient access to data stored therein through a signal cable assembly. In addition, the portable hard disk drive is also powered by a direct current. As a result, the requisite for a portable hard disk drive is easy to use and operate. If the portable hard disk drive were provided with authentic appearance, it would be a perfect match.

The existing commercial portable hard disk drive uses screws to securely mount a hard disk drive therein. As a result, the screws have to be unscrewed firstly from a bracket before install or remove a hard disk drive thereon. After the hard disk drive is securely fixed, a portable cover is further attached to a housing of the portable hard disk drive. Apparently, this is a laborious proceeding, which is not user friendly. On the other hand, the existing portable hard disk drive does not have an authentic appearance.

SUMMARY OF THE INVENTION

It is an object of this invention to provide a portable hard disk drive in which the hard disk drive can be easily installed and unsealed without screws. In addition, the portable hard disk drive provides visual illumination when it is standby.

In order to achieve the object set forth, a portable disk drive in accordance with the present invention includes a housing made from aluminum alloy. The housing is provided with a front cover having a hook release button mounted thereon. The housing is provided with transparent side panels. A rear panel integrally formed with a supporting bracket on which a printed circuit board is mounted. The printed circuit board is mounted LED with respect to the transparent side panels. The supporting bracket is provided with a latch, which interlocks with a hook of the hook release button when the support bracket is inserted into the housing. When the portable hard disk drive is electrically connected, the LED illuminates the side panels.

DETAILED DESCRIPTION OF PREFERRED EMBODIMENTS

Figure 1:
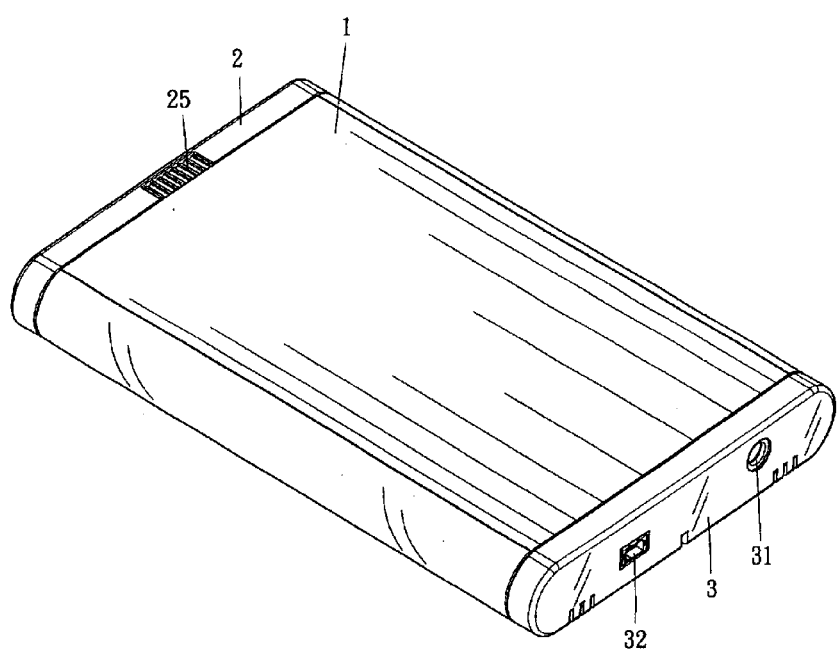
FIG. 1 is a perspective view of a portable hard disk drive in accordance with the present invention.
Figure 2:
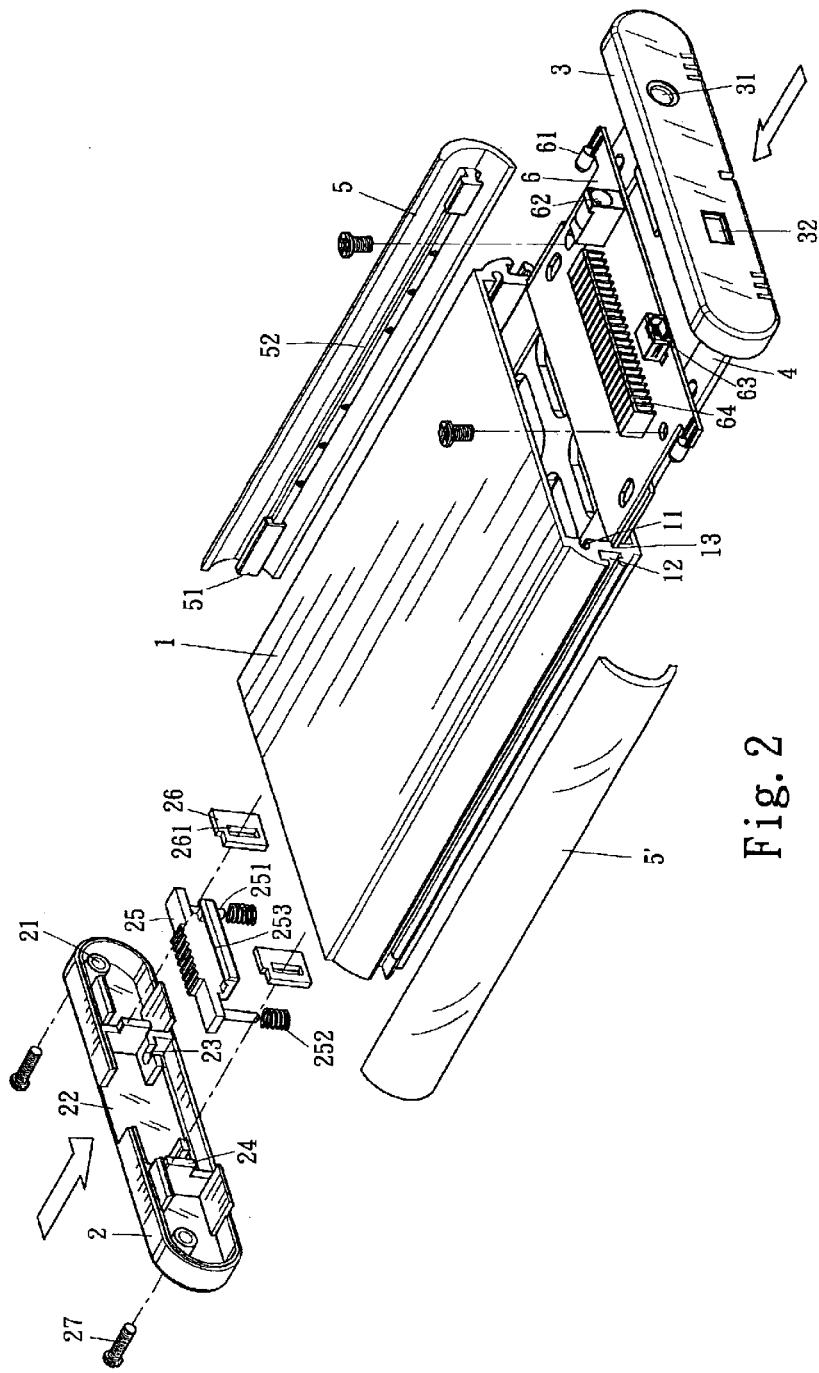
FIG. 2 is an exploded view of FIG. 1.
Figure 3:
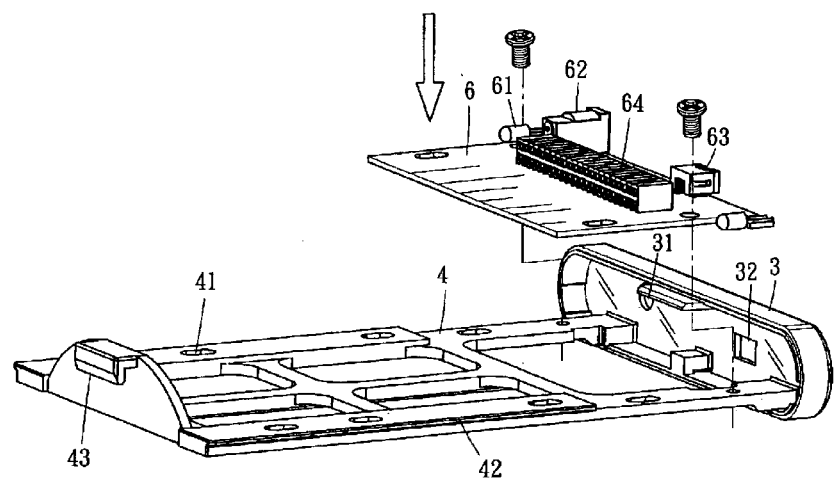
FIG. 3 is an exploded view showing rear cover, supporting bracket, and a printed circuit board.
Figure 4:
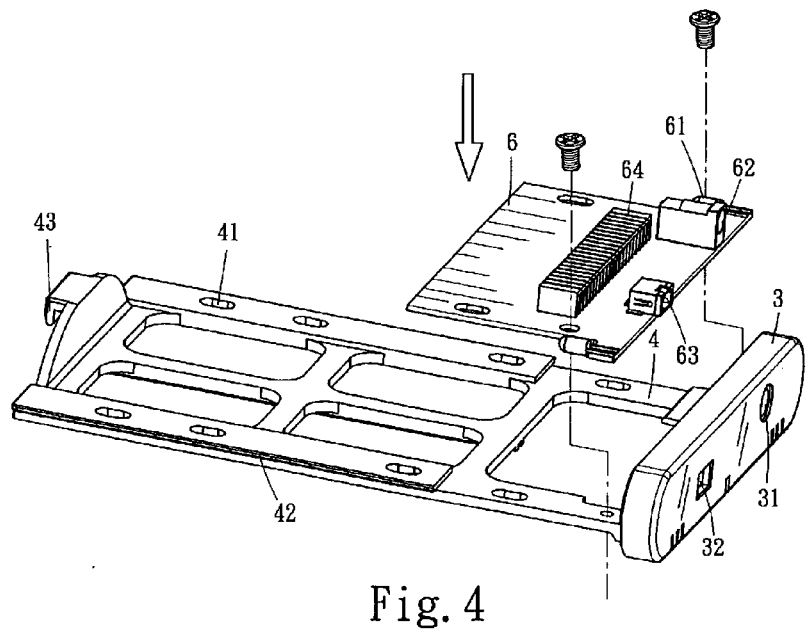
FIG. 4 is similar to FIG. 3 taken from another angle of view.

Referring to FIGS. 1 and 2, a portable hard disk drive in accordance with the present invention includes a housing 1 made from aluminum alloy having preferable heat dissipation performance, a front cover 2, a rear cover 3, a hard disk drive bracket 4, transparent side panels 5, and printed circuit board 6.

The housing 1 defines a hollow inner space and provides with threaded slot 11 and mounting slot 12. A guiding rail 13 is provided on a hollow sidewall. The transparent side panels 5, 5' are mounted to the mounting slot 12 by mounting rails 51 formed on the side panels 5, 5'. The side panels 5, 5' are provided with wave-guide 52.

The front panel 2 is provided with threaded holes 21 and a cutoff 22 directed upward. The front panel 2 is further provided with a hole 23 and a stopper 24 for mounting of a first hook release button 25 together with a shaft 251, coil spring 252 which are inserted into the hole 23 and a bushing 26 is attached to the stopper 24 with an opening 261 thereof so as to fixedly position the first hook release button 25. By this arrangement, the first hook release button 25 can move upward and downward. The hook release button 25 is provided with a hook 253. The front panel 2 is mounted to the housing 1 by screws 27 which are threaded into the threaded slot 11 of the housing 1.

The rear cover 3 is integrally formed with the hard disk drive bracket 4. The hard disk drive bracket 4 is provided with mounting holes 41 for securely mounting a hard disk drive thereon. The hard disk drive bracket 4 is provided with guiding rails 42. A tail portion of the bracket 4 is provided with a latch 43 with respect to the hook 253 of the hook release button 25.

The hard disk drive bracket 4 is further mounted with a printed circuit board 6 having LED 61 mounted thereon with respect to the transparent panels 5. The printed circuit board 6 is further provided with power input 62, signal input 63 with respect to a power input hole 31 and signal input hole 32 defined in the rear cover 3. The printed circuit board 6 is further provided with a hard disk drive connecting port 64.

In use, a hard disk drive can be securely fixed to the bracket 4 firstly. Then the rear cover 3 and the bracket 4 are inserted into the housing 1 by means of the guiding rails 42 along the guiding slot 13. When the bracket 4 is pushed into to a certain point, the hook 253 of the hook release button 25 will interlock with a latch 43 of the bracket 4. As a result, the bracket 4 and the hard disk drive can be easily installed within the housing 1 without the use of screws. When the user wants to remove the bracket 4, a simple push to the hook release button 25 located on the front panel 2 will release the engagement for withdraw of the bracket 4.

The LED 61 mounted on the printed circuit board 6 may have different colors and the light emitted therefrom can be directed by the wave-guide 52 of the panels 5, 5'. As a result, the panels 5, 5' of the housing 1 may have different colors adjacent to the power input and signal input.

I claim:

1. A portable hard disk drive housing, defining a hollow inner space with transparent panels arranged at sides, a front cover arranged at front portion, a hook releasing button having a hook attached thereto arranged at the front cover, a rear cover integrally formed with a supporting bracket on which a hard disk drive is adapted to be mounted thereon, the supporting bracket being provided with a latch interlocked with said hook of the hook release button, by this arrangement, when the rear cover and the supporting bracket are pushed into the housing, the latch of the supporting bracket are interlocked with the hook of the hook release button without using screws.

2. The portable hard disk drive as recited in claim 1, wherein the supporting bracket is mounted with a printed circuit board having LED arranged thereon with respect to the transparent panels which homogenously distributing a light beam from the LED through a wave-guide on the transparent panel.

3. The portable hard disk drive as recited in claim 2, wherein the printed circuit board is provided with power input, signal input, a connection for hard disk drive provided with power input, signal input, and hard disk drive connecting terminals, by this arrangement the power and signal are connected to the housing and finally to the hard disk drive.

4. The portable hard disk drive as recited in claim 1, wherein the supporting bracket is provided with guiding rails on side so as to slide forward and backward along a slot defined in the housing.

* * * * *